US006980378B2

(12) United States Patent
Lee

(10) Patent No.: US 6,980,378 B2
(45) Date of Patent: Dec. 27, 2005

(54) IMAGE DISPLAY APPARATUS

(75) Inventor: Cheng-Kuang Lee, Taishan Shiang (JP)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/917,674

(22) Filed: Aug. 13, 2004

(65) Prior Publication Data

US 2005/0036216 A1 Feb. 17, 2005

(30) Foreign Application Priority Data

Aug. 14, 2003 (TW) .............................. 92122351 A

(51) Int. Cl.[7] .................................................. G02B 9/00
(52) U.S. Cl. ....................................... 359/740; 359/613
(58) Field of Search ................................ 359/738, 739, 359/740, 613, 614

(56) References Cited

U.S. PATENT DOCUMENTS 6,549,324 B2 4/2003 Evans
6,870,691 B2 * 3/2005 Konno ........................ 359/738

* cited by examiner

*Primary Examiner*—Georgia Epps
*Assistant Examiner*—Darryl J. Collins
(74) *Attorney, Agent, or Firm*—Snell & Wilmer L.L.P.

(57) ABSTRACT

An image display apparatus for enhancing contrast is provided. The apparatus includes a tunable illumination mask and/or a tunable image mask. According to the light path in the image display apparatus, the tunable illumination mask dynamically controls the area through which the light passes to block noise such as scattering or diffraction light and thereby enhances contrast.

12 Claims, 5 Drawing Sheets

IMAGE DISPLAY APPARATUS

CROSS-REFERENCE TO RELATED APPLICATION

This Application claims priority to Taiwan Patent Application No. 92122351 filed on Aug. 14, 2003.

FIELD OF INVENTION

The present application generally relates to an image display apparatus for enhancing the contrast, and more particularly to an image display apparatus to block light of noise-type for enhancing the contrast.

BACKGROUND OF THE INVENTION

In parallel with the progress of business activities and the development of interactive learning, projectors have become indispensable image display apparatuses in many fields. The image displaying technology is advancing from the liquid crystal display (LCD) to digital light processing (DLP).

The digital light processing technology employs reflected light, which is modulated by the spatial light modulator (SLM), such as the generally known digital micromirror device (DMD). The DMD is a bistable spatial light modulator consisting of multiple arrays of many pixels. Each pixel has a micromirror. FIG. 1 illustrates a single pixel of DMD. By individually controlling the tilt angle of each micromirror 10, every micromirror 10 can be selectively arranged in two states, namely an "on" state (+θ degrees) 10*a* and an "off" state (−θ degrees) 10*b*. Light source is denoted by reference numeral 14. Light reflected by micromirrors 10*a* in the "on" state passes through the projection lens 16 onto a screen. Light reflected by micromirrors 10 in the "off" state 10*b* reaches an integrator 18 and a dark field is created. Images are created by gray-scale modulation between the "on" 10*a* and "off" 10*b* states. The flat state 10*c* occurs when the micromirrors 10 are not landed (no deflection). The flat state 10*c* is not a stable state (not tristable).

Contrast, brightness, resolution, weight, light source lifetime are the indices for determining the quality of a projector. Scattering and diffraction are the dominant mechanisms that determine the contrast. Contrast is defined as the ratio of the light intensities between "on" 10*a* and "off" 10*b* states of the spatial light modulator device. Contrast can be enhanced by either increasing the light intensity of the on-state 10*a*, or by decreasing the light intensity of the off-state 10*b*. As the brightness of the off-state approaches zero, a small absolute drop in off-state brightness results in a higher impact to the overall contrast. However, owing to scattering and diffraction from the flat state 10*c*, the brightness of the off-state doesn't actually approach zero. So far, the conventional techniques do not have relatively satisfactory solutions. Thus, the contrast-improving techniques described in this application concentrate on enhancing the contrast by lowering the brightness of the off-state.

SUMMARY OF THE INVENTION

The present invention provides an image display apparatus to dynamically block light of noise-type, such as light from scattering and diffraction, for enhancing the contrast.

Firstly, the image display apparatus of the present invention includes a light source, an illumination module and a tunable illumination mask. The light source is for projecting light onto the illumination module. The illumination module includes an illumination stop. The tunable illumination mask includes an illumination hole, which is positioned at the location of the illumination stop. The size of the illumination hole is adjustable so as to effectively block light of noise-type from the illumination module. In order to further enhance the effect, the illumination module defines a centerline. The illumination module contains lenses and optical elements aligning with the centerline. The tunable illumination mask is capable of moving two-dimensionally to make the center of the illumination hole deviate from the centerline to an optimal position to substantially block light of noise-type. At the same time, the size of the illumination hole is adjusted to block light of noise-type, such as scattering and diffraction from the illumination module.

Secondly, the present invention also provides another image display apparatus including a light source, an image module, a tunable image mask and a spatial light modulator. The image module includes a projection-lens stop. The tunable image mask includes an image hole, which is positioned at the location of the projection-lens stop. The size of the image hole is adjustable so as to block light of noise-type from the image module. In order to further enhance the effect, the spatial light modulator and the image module define a centerline. Lenses and optical elements in the spatial light modulator and the image module all align with the centerline. The tunable image mask, which has a function similar to that of the tunable illumination mask, is able to block light of noise-type such as scattering and diffraction. The tunable image mask positioned at the location of the projection-lens stop dynamically adjusts the size of the image hole according to the modulation result of the spatial light modulator, and is capable of moving two-dimensionally to an optimal position to substantially reduce light of noise-type on the screen, so as to enhance the contrast.

In addition, the two above-mentioned image display apparatuses may be integrated into one to include a light source, an illumination module, an image module, a tunable illumination mask, a tunable image mask and a spatial light modulator. The image display apparatus is better able to block light of noise-type because both the tunable illumination mask and the tunable image mask are present. The tunable illumination mask and the tunable image mask can substantially block light of noise-type such as scattering and diffraction by dynamically adjusting their positions and the areas that allow light to pass through according to the direction of the incoming light in the apparatus, and thereby enhance the contrast of the apparatus.

DETAILED DESCRIPTION

EXAMPLE 1

Figure 2:
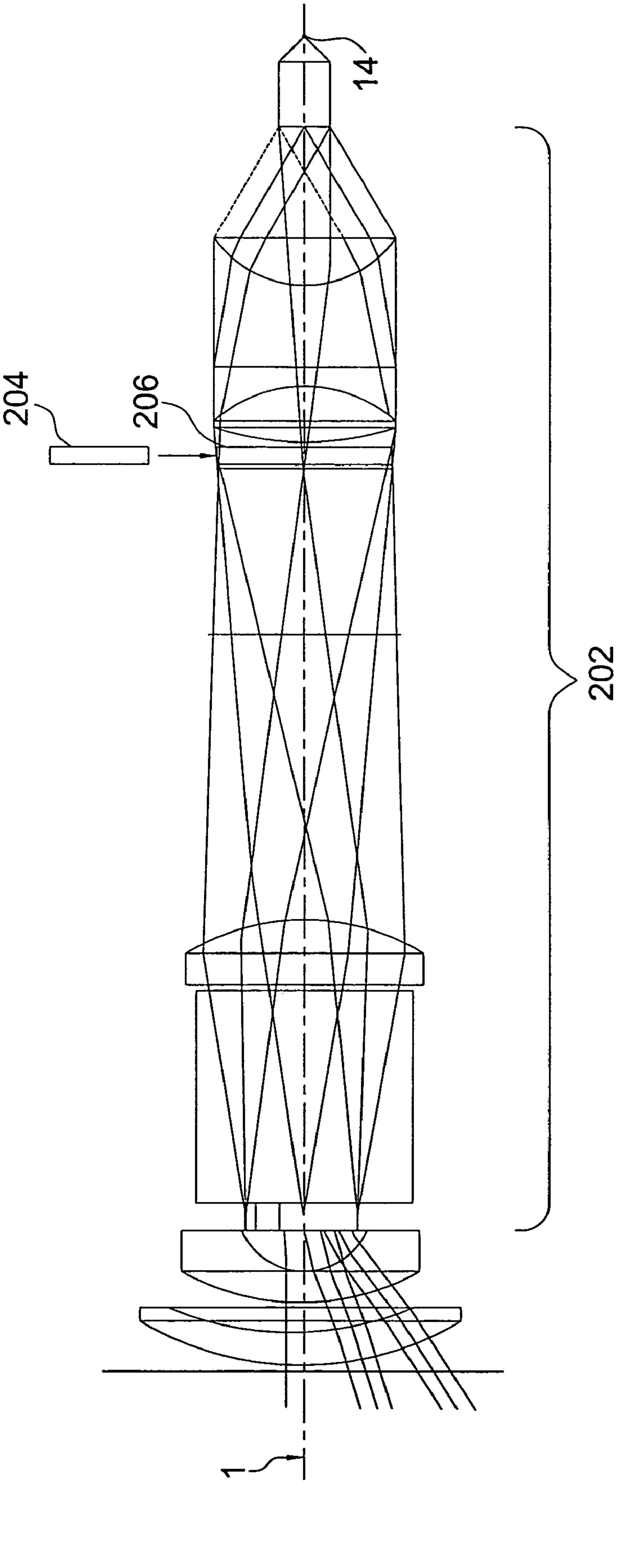
FIG. 2 illustrates an image display apparatus of Example 1 of the present invention.
Figure 3:
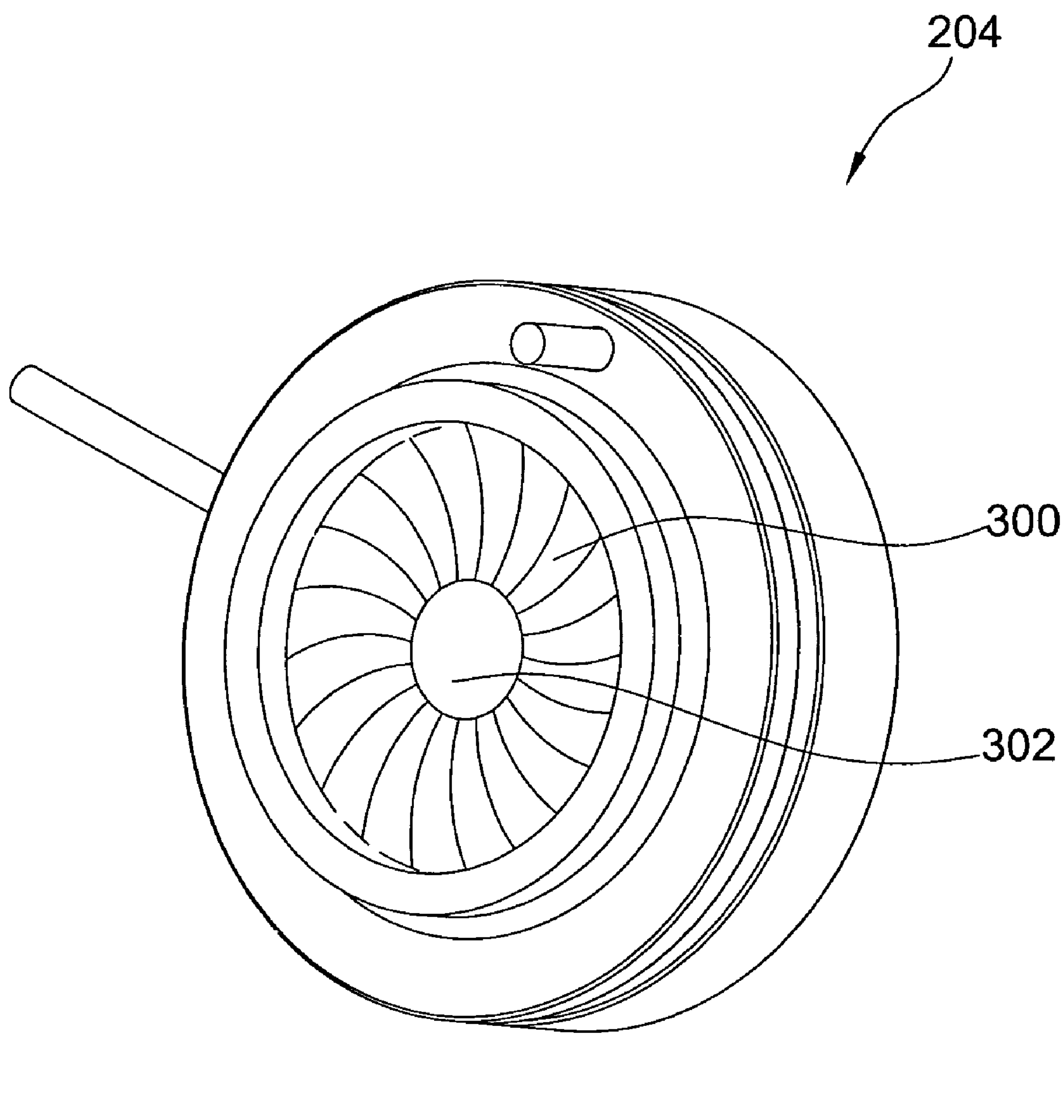
FIG. 3 illustrates the tunable illumination mask and the tunable image mask of the present invention.

FIG. 2 illustrates the image display apparatus of the present invention, including a light source 14, an illumination module 202 and a tunable illumination mask 204. The light source 14 is for projecting light onto the illumination module 202. The illumination module 202 includes an illumination stop 206. The tunable illumination mask 204 includes an illumination hole 302 (as shown in FIG. 3), which is positioned at the location of the illumination stop 206 indicated by the direction of the arrow shown in FIG. 2. The size of the illumination hole 302 is adjustable so as to effectively block light of noise-type from the illumination module 202.

The above-mentioned tunable illumination mask 204 consists of a plurality of movable diaphragms 300 that overlap with one another to form the illumination hole 302 for the light to pass through. The size of the illumination hole 302 can be adjusted by adjusting the movable diaphragms 302, so that the light passing through the illumination hole 302 can be adjusted as well. Thus, the tunable illumination mask 204 blocks light of noise-type such as scattering and diffraction and only allows the desirable light to pass through.

Even though the tunable illumination mask 204 alone may block light of noise-type, it would be better if the position of the tunable illumination mask 204 itself is adjustable according to the direction of the incoming light. The present invention provides a tunable illumination mask that is further capable of moving two-dimensionally. The illumination module 202 defines a centerline 1 and contains lenses and optical elements aligning with the centerline 1. The tunable illumination mask 204 is capable of moving two-dimensionally to make the center of the illumination hole 302 deviate from the centerline 1 to an optimal position to substantially block light of noise-type such as scattering and diffraction from the illumination module 202. Specifically speaking, the center of the light overlaps with the centerline 1 but the center of the illumination hole 302 deviates from the centerline 1. Accordingly, the light passing through the illumination hole 302 is in a shape of a "cat eye" and the tunable illumination mask 204 therefore blocks light of noise-type such as scattering and diffraction.

EXAMPLE 2

Figure 1:
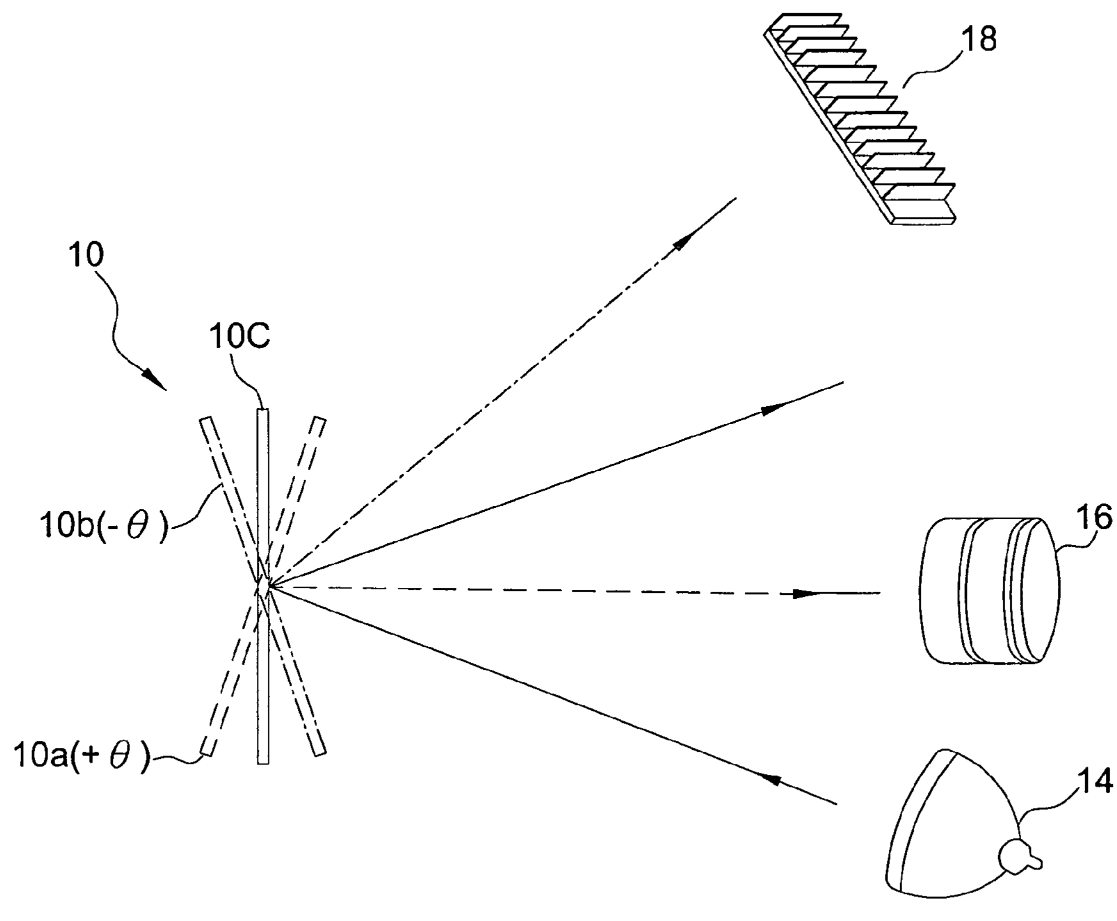
FIG. 1 illustrates a single pixel of a conventional DMD.
Figure 4:
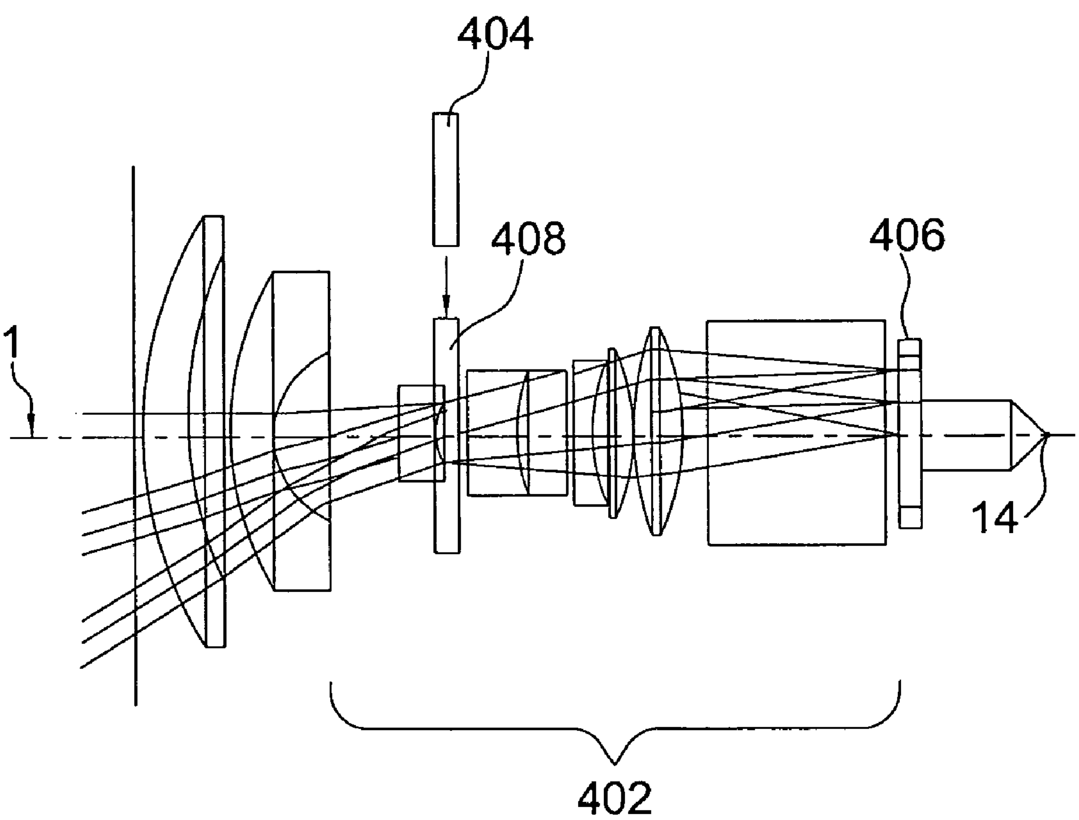
FIG. 4 illustrates an image display apparatus of Example 2 of the present invention.

The present invention further provides a second image display apparatus (as shown in FIG. 4) including a light source 14, an image module 402, a tunable image mask 404 and a spatial light modulator 406. The difference between EXAMPLE 2 and EXAMPLE 1 is that EXAMPLE 2 includes a spatial light modulator 406, which can be a digital micromirror device (DMD). The spatial light modulator 406 as shown in FIG. 1 may have an "on" state 10*a*, a "flat" state 10*c* and an "off" state 10*b* for selectively modulating the light to form an image on the screen.

The image module 402 includes a projection-lens stop 408. The tunable image mask 404 includes an image hole that is structurally similar to the image hole 302 in FIG. 3. The tunable image mask 404 is positioned at the location of the projection-lens stop 408, which is indicated by the direction of the arrow in FIG. 4. The function of the tunable image mask 404 is similar to that of the tunable illumination mask 204 in FIG. 2. They all block light of noise-type such as scattering and diffraction. The tunable image mask 404 also consists of a plurality of movable diaphragms 300 and includes an adjustable image hole that acts like the image hole 302. To further enhance the results, the tunable image mask 404 is capable of moving two-dimensionally. The spatial light modulator 406 and the image module 402 define a centerline 1 and contain lenses and optical elements aligning with the centerline 1. Based on the modulation result of the spatial light modulator 406, the tunable image mask 404 is capable of moving two-dimensionally according to the direction of the light, to an optimal position to substantially diminish the light of noise-type on the screen to enhance the contrast.

EXAMPLE 3

Figure 5:
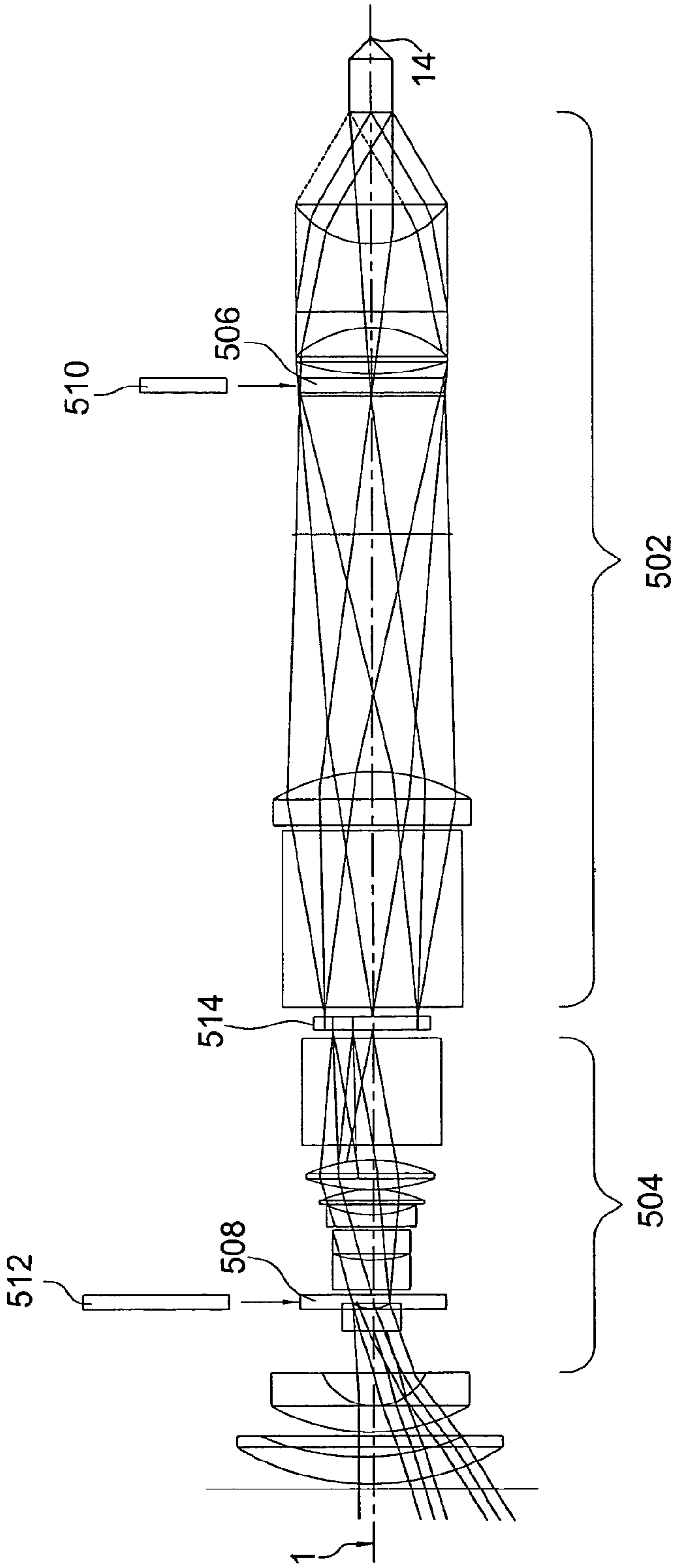
FIG. 5 illustrates an image display apparatus of Example 3 of the present invention.

This example combines all the necessary elements (shown in FIG. 5) that are disclosed in EXAMPLE 1 and EXAMPLE 2, including a light source 14, an illumination module 502, an image module 504, a tunable illumination mask 510, a tunable image mask 512 and a spatial light modulator 514. The spatial light modulator 514 lies between the illumination module 502 and the image module 504. The illumination module 502, the spatial light modulator 514 and the image module 504 define a centerline 1 and contain lenses and optical elements aligning with the centerline 1. In this image display apparatus, the tunable illumination mask 510 and the tunable image mask 512 (according to the direction of the arrow illustrated in FIG. 5) are located in the illumination stop 506 and in the projection-lens stop 508 to more effectively block the light of noise-type.

The spatial light modulator 514 may still be a digital micromirror device. Following the conventional techniques of the mechanism of the digital micromirror, the tunable illumination mask 510 and the tunable image mask 512 may dynamically block the light of noise-type in the "flat" state 10*c*. In the illumination module 502, according to the tilt angle of the "on" state (+θ degrees) 10*a* and the "off" state (−θ degrees) 10*b* of the digital micromirror device 514, the light passing through the projection-lens stop 508 in the "flat" state 10*c* can be calculated. Based on this result, the area on the illumination stop 506 that the light passes through is determined, and then the tunable illumination mask 510 can be used to block in advance the light of noise-type that may potentially interfere with the digital micromirror device 514. By adjusting the size of the illumination hole 302 and the two-dimensional position of the tunable illumination mask 510 to block the light of noise-type, the interference in the spatial light modulator 514 is decreased and the contrast is enhanced. In the image module 504, the tunable image mask 512 is positioned at the location of the projection-lens stop 508, and the size of the image hole is dynamically adjusted according to the modulation result of the spatial light modulator 514 to control the lighted area on the screen. Simultaneously, the tunable image mask 512 is capable of moving two-dimensionally in accordance with the direction of the light to an optimal position to block the diffraction from the "flat" state 10*c* and the "off" state 10*b* to diminish the light of noise-type on the screen and to enhance the contrast.

By means of the detailed descriptions of what is presently considered to be the most practical and preferred embodiments of the subject invention, it is the expectation that the features and the gist thereof are plainly revealed. Nevertheless, these above-mentioned illustrations are not intended to be construed in a limiting sense. Instead, it should be well understood that any analogous variation and equivalent arrangement is supposed to be covered within the spirit and scope to be protected and that the interpretation of the scope of the subject invention would therefore as much as broadly apply.

What is claimed is:

1. An image display apparatus, comprising:

a light source for projecting light;

an illumination module, comprising an illumination stop; and a tunable illumination mask comprising an illumination hole and being positioned at a location of said illumination stop;

wherein, said illumination module defines a centerline, and said tunable illumination mask is capable of moving to make a center of said illumination hole deviate from said centerline to block light of noise-type from said illumination module.

2. The image display apparatus of claim 1, wherein said image display apparatus further comprises a spatial light modulator for selectively modulating said light, a center of said spatial light modulator coincides with said centerline.

3. The image display apparatus of claim 2, wherein said image display apparatus further comprises:

an image module, comprising a projection-lens stop; and a tunable image mask comprising an image hole and being positioned at a location of said projection-lens stop;

wherein, a center of said image module coincides with said centerline, and said tunable image mask is capable of moving to make a center of said image hole deviate from said centerline to block light of noise-type from said spatial light modulator.

4. The image display apparatus of claim 3, wherein said tunable illumination mask and said tunable image mask respectively consist of a plurality of movable diaphragms, and a plurality of said movably diaphragms overlap with one another to respectively form said illumination hole and said image hole for said light to pass through.

5. The image display apparatus of claim 4, wherein size of said illumination hole or of said image hole is adjustable by adjusting said movable diaphragms.

6. An image display apparatus, comprising:

a light source for projecting light;

a spatial light modulator for selectively modulating said light;

an image module comprising a projection-lens stop; and a tunable image mask comprising an image hole and being positioned at a location of said projection-lens stop;

wherein, said spatial light modulator and said image module define a centerline, and said tunable image mask is capable of moving to make a center of said image hole deviate from said centerline to block light of noise-type from said spatial light modulator.

7. The image display apparatus of claim 6, wherein said image display apparatus further comprises:

an illumination module comprising an illumination stop; and a tunable illumination mask comprising an illumination hole and being positioned at a location of said illumination stop;

wherein, a center of said illumination module coincides with said centerline, and said tunable illumination mask is capable of moving to make a center of said illumination hole deviate from said centerline to block light of noise-type from said illumination module.

8. The image display apparatus of claim 7, wherein said tunable illumination mask and said tunable image mask respectively consist of a plurality of movable diaphragms, and a plurality of said movably diaphragms overlap with one another to respectively form said illumination hole and said image hole for said light to pass through.

9. The image display apparatus of claim 8, wherein size of said illumination hole or of said image hole is adjustable by adjusting said movable diaphragms.

10. An image display apparatus, comprising:

a light source for projecting light;

an illumination module comprising an illumination stop;

a spatial light modulator for selectively modulating said light;

an image module comprising a projection-lens stop;

a tunable illumination mask comprising an illumination hole and being positioned at a location of said illumination stop; and a tunable image mask comprising an image hole and being positioned at a location of said projection-lens stop;

wherein, said illumination module, said spatial light modulator and said image module define a centerline, and said tunable illumination mask and said tunable image mask are capable of moving to make a center of said illumination hole and of said image hole deviate from said centerline to respectively block light of noise-type from said illumination module and from said spatial light modulator, separately.

11. The image display apparatus of claim 10, wherein said tunable illumination mask and said tunable image mask respectively consist of a plurality of movable diaphragms, and a plurality of said movably diaphragms overlap with one another to respectively form said illumination hole and said image hole for said light to pass through.

12. The image display apparatus of claim 11, wherein size of said illumination hole or of said image hole is adjustable by adjusting said movable diaphragms.

* * * * *